United States Patent [19]

Linthout

[11] 4,024,885

[45] May 24, 1977

[54] PROCESS AND APPARATUS FOR CONTROLLING THE CONCENTRATION OF DIAZOTYPE DEVELOPING LIQUID

[75] Inventor: Theodoor Hillebrand Linthout, Grubbenvorst, Netherlands

[73] Assignee: Océ-van der Grinten N.V., Venlo, Netherlands

[22] Filed: Sept. 4, 1974

[21] Appl. No.: 503,173

[30] Foreign Application Priority Data

Sept. 10, 1973 Netherlands ............... 7312422

[52] U.S. Cl. ............................ 137/91; 137/93; 96/49; 137/393; 222/358
[51] Int. Cl.[2] ............................ G05D 11/02
[58] Field of Search ......... 96/49; 137/91, 393, 137/88, 90, 92, 93; 222/358, 55, 56, 57, 36

[56] References Cited
UNITED STATES PATENTS

| 871,580 | 11/1907 | Forrester | 222/358 |
|---|---|---|---|
| 1,719,898 | 7/1929 | McNeil | 137/90 |
| 2,100,316 | 11/1937 | Harper | 222/55 |
| 2,600,937 | 6/1952 | Strattman | 222/358 |
| 3,117,381 | 1/1964 | Durkin | 137/393 |
| 3,195,551 | 7/1965 | Russell | 137/91 |
| 3,241,718 | 3/1966 | Kemper | 222/358 |

Primary Examiner—William R. Cline
Assistant Examiner—H. Jay Spiegel
Attorney, Agent, or Firm—Albert C. Johnston

[57] ABSTRACT

A reserve supply of diazotype developing liquid from which liquid is supplied to semi-dry diazotype developing apparatus is maintained at both a substantially constant level and the required concentration of azo coupling component by introducing solvent for the liquid to restore the liquid level upon a decrease of the supply volume, sensing the specific gravity of the supply liquid by a hydrometer, and counteracting the decrease of concentration resulting from solvent addition by introducing a liquid concentrate containing the azo coupling component and electrolyte in response to a lowering of the hydrometer.

5 Claims, 4 Drawing Figures

PROCESS AND APPARATUS FOR CONTROLLING THE CONCENTRATION OF DIAZOTYPE DEVELOPING LIQUID

This invention relates to a process and apparatus for controlling the concentration of a reserve supply of developing liquid held in a receptacle from which the liquid is supplied to the development zone of an apparatus used for semi-dry development of diazotype material.

The diazotype developing liquid consists essentially of at least one azo coupling component, electrolyte and a solvent. A technique for controlling its concentration is known from Van der Grinten Bulletin No. 2, Pages 2–7, published in the Netherlands on or about Aug. 1, 1955. In this known technique the required level of the liquid in the receptacle is maintained by supplying into the receptacle a solution having the same concentration as the desired concentration of the developing liquid, and a hydrometer is used to control the concentration of the liquid. When that concentration increases as a result of evaporation of the solvent, the depth of immersion of the hydrometer decreases; so the hydrometer rises to a higher location in the body of liquid kept at constant level. This causes an electric contact to be made, as a result of which solvent is supplied into the receptacle until the concentration of the solution therein has again reached the desired value.

That known technique has a disadavantage in that the level of the liquid in the receptacle, although always having a certain minimum value, may vary considerably above this valuue due to the fact that relatively large quantities of solvent may be supplied in order to restore the required concentration. Consequently, the level of the liquid in the receptacle may deviate rather far from the prescribed minimum level. This directly affects the quality of the development obtained.

The object of the present invention is to provide a process and apparatus of the type above mentioned by which the stated disadvantage is overcome.

According to this invention, when the level of the developing liquid in the receptacle falls below a prescribed level the liquid level is restored by the addition of solvent having a lower specific gravity than the developing liquid, whereupon a hydrometer reacts to the decrease of the specific gravity of the developing liquid caused by the added solvent, and a liquid concentrate containing the azo coupling component and electrolyte is dosed into the developing liquid in response to the change of position of the hydrometer until the desired concentration of the developing liquid has been restored.

In this way, with the suitable selection of the concentration of the azo coupling component in the developer concentrate, it is possible to minimize deviations from the desired liquid level, which is maintained by additions of solvent, while also keeping the developing liquid in the receptacle at the required concentration. If need be, the azo coupling can even be supplied in an undissolved state.

The invention also provides an apparatus for carrying out the process mentioned above, which apparatus comprises a receptacle to hold a reserve supply of the developing liquid, a first reservoir for the supplementing solvent component of the liquid and a second reservoir for a concentrated solution of azo coupling component and electrolytes, together with means responsive to a lowering of the liquid level in the receptacle for supplying solvent from the first reservoir into the receptacle and means activated by the lowering of a hydrometer in the receptacle for dosing the concentrated solution from the second reservoir into the receptacle.

The above-mentioned and other object, features and advantages of the invention will be apparent from the following detailed description and the accompanying drawings of illustrative embodiments of the invention. In the drawings.

Figure 1:
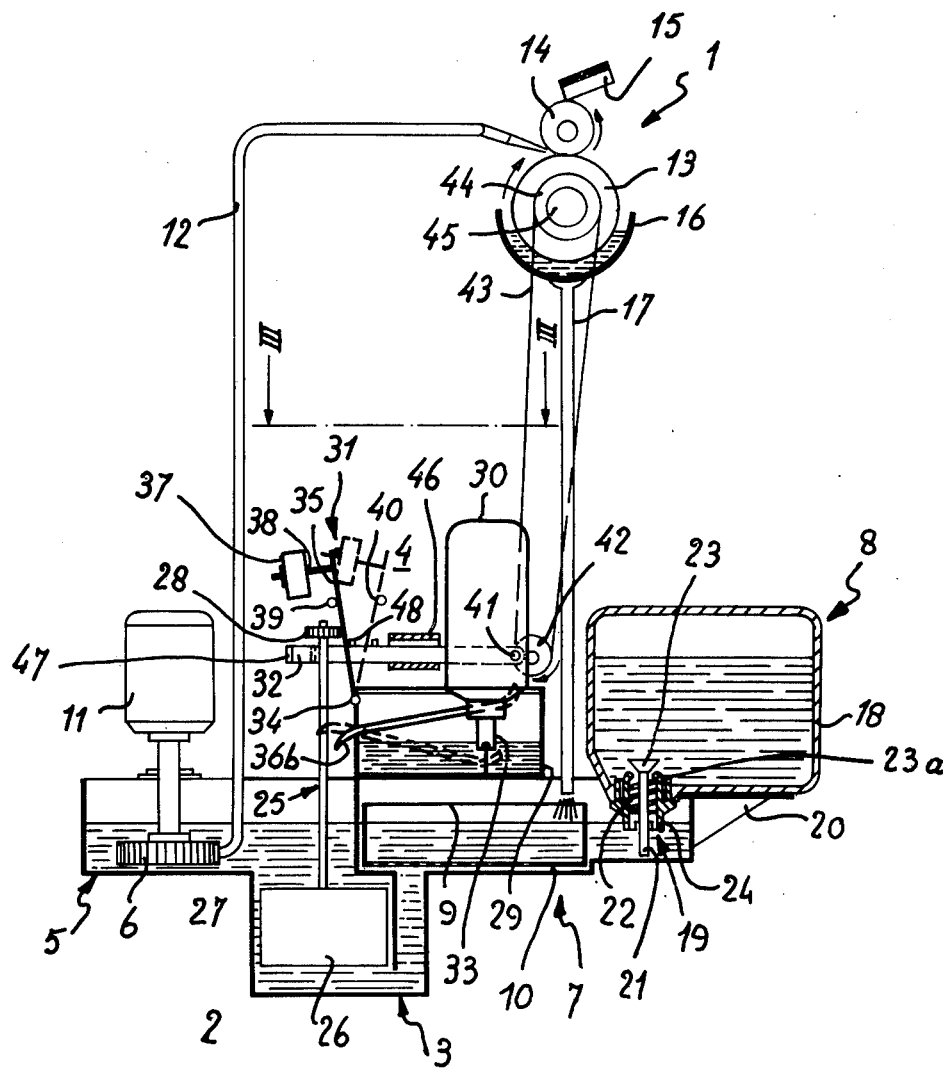
FIG. 1 is a schematic sectional view of an apparatus embodying the invention.

The embodiment of the invention shown in FIG. 1 includes a developing apparatus at 1 for applying developing liquid to diazotype material and a receptacle system at 2 for holding a reserve quantity of the developing liquid. The developing liquid may be, for instance, a buffered aqueous solution of an azo component such as that described more particularly in Dutch patent application No. 72 07 099.

The receptacle 2 comprises threee sections 3, 5 and 7 which are connected with each other so that they hold a common body of liquid all parts of which are in open intercommunication. Section 3 is a relatively deep central section which receives an immersion body 26 of a concentration control system 4. Section 5 is a shallower lateral section having a pump 6 mounted therein and section 7 is another shallower lateral section having a level control system 8 placed therein. The shallow lateral section 7 further comprises an enclosure 9 the bottom of which is constituted by a foraminous filtering partition 10, and into which developing liquid is returned by a pipe 17 leading from a trough 16 of the developing apparatus 1.

The pump 6 is driven by a motor 11. When the motor is active, developing liquid is fed from lateral section 5 of the receptacle 2 via a pipe 12 to the developing apparatus 1. The developing apparatus 1 as shown is of the type described in Dutch patent application No. 73 01 622. It comprises a dosing roller 13 which conducts the developing liquid to a contacting application roller 14 from which a dosed quantity of developing liquid is applied to a sheet of diazotype material passed between a sheet pressing element 15 and roller 14. Superfluous developing liquid is collected in the trough 16, from where the liquid is carried back via return pipe 17 and filtering partition 10 into the shallow section 7 and thence into the deeper central section 3 of the supply receptacle 2.

The developing liquid consumed in the developing apparatus 1 is replenished by supplying solvent from a reservoir 18 and by supplying a concentrated solution of the azo coupling component, by means of the concentration control system 4, so as to maintain the azo component at the required concentration in the developing liquid held in receptacle 2.

The solvent reservoir 8 is provided with a dosing valve 19 whereby the body of liquid in the receptacle 2 is maintained at a substantially constant level. The dosing valve 19 is brought into working condition simply by placing the reservoir 18 on a support 20 fixed to a wall of the receptacle 2. A pin 21 of the dosing valve is thus forced upward against the action of a spring 22, so that a valve head 23 is displaced away from its seat 23a and the solvent in reservoir 18 is then in free communication with the liquid in the receptacle 2. When the level of that liquid falls below the edges 24 of notches provided in the outlet of the dosing valve 19, i.e., when the liquid level becomes lower than that prescribed by the location of the notch edges 24, the solvent flows out of the reservoir 18 until the liquid level has again reached the top edges 24 of the notches.

Since the volume of developing liquid consumed is replenished by solvent from the reservoir 18, there is at first a corresponding reduction of the concentration of the azo coupling component in the developing liquid held in receptacle 2. This concentration, however, is constantly being sensed by a concentration meter 25, or hydrometer, having a body 26 immersed in the section 3, or well, of the receptacle 2. The immersion body 26 has a rod 27 extending vertically from it to a disk-like enlargement 28 on the upper end of the rod 27. The weight of the concentration meter 25 is so chosen in relation to the specific gravity possessed by the developing liquid when the azo component is at the desired concentration therein that at the desired azo component concentration the immersion body 26 is suspended in the liquid. Accordingly, upon a decrease of the concentration of azo coupling component in the developing liquid the immersion body starts sinking, while upon an increase thereof it starts rising, in the well section 3 of the receptacle 2.

Figure 3:
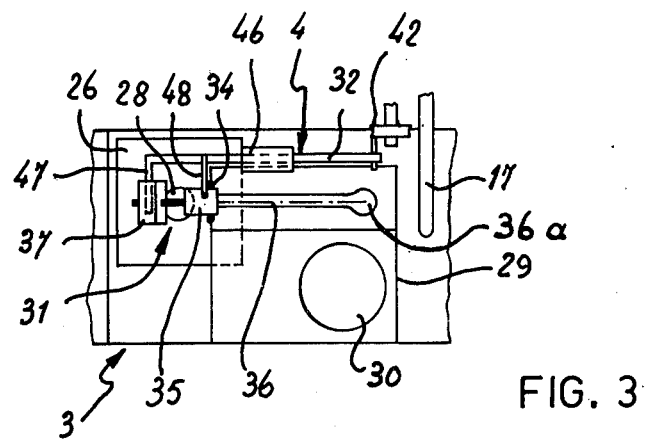
FIG. 3 is a plan view of a portion of the apparatus of FIG. 1, taken from line III—III in FIG. 1.

As represented in FIGS. 1 and 3, the concentration control system 4 comprises not only the concentration meter 25 but also a reservoir 29 in which is placed a supply bottle 30 containing a developer concentrate, and a device at 31 is provided for dosing the developer concentrate from reservoir 29 into the liquid held in receptacle 2.

The supply bottle 30 is filled with a liquid concentrate containing the azo component at a concentration a few times greater than that desired in the developing liquid. Bottle 30 is supported removably in an upper wall structure of the reservoir 29. Reservoir 29 is firmly secured to an upper wall portion of the liquid supply receptacle 2. The liquid level in the reservoir 29 is kept constant by means of a dosing valve 33 which works in the same way as the dosing valve 19.

A wall of the reservoir 29 proximate to the concentration meter 25 is provided with an opening in which the dosing device 31 is mounted so that it can oscillate about the axis of a shaft 34. The device 31 comprises a lever 35 fixed between its ends to the rotary shaft 34, with a spoon element 36 fixed to the lower end of lever 35 and a counterweight 37 fixed to the upper end thereof by means of a transverse pin 38. The range of movement of the device 31 about the axis of shaft 34 is limited by two stop elements 39 and 40. The mass of the counterweight 37, its position on the pin 38 relative to the lever 35 and the length of the lever 35 are so chosen that the dosing unit 31 is at all times biased by the counterweight toward one or the other of the limits of oscillatory movement.

The spoon element 36 has the form of an elongate trough one end of which is curved upwardly from its longitudinal axis to form a spoon 36a (FIG. 3) and the other end of which is curved downwardly therefrom to constitute a pouring lip 36b (FIG. 1). Element 36 may be obtained, for instance, by bending an ablong plate into a longitudinal trough shape and bending its ends into the spoon and the pouring lip, respectively. The element 36 is positioned on the lever 35, as by soldering it thereto, so that in one limiting position of the lever the spoon end 36a is immersed in the developer concentrate held in reservoir 29 and so that, upon swinging movement of the lever 35 to its other limiting position, a quantity of developing liquid is picked up by the spoon 36a and flowed along the trough of element 36 to the lip end 36b thereof, from which the dose of concentrate is poured into the central station 3 of the supply receptacle 2, where the concentration meter 25 is located.

The concentration control system 4 further comprises a reciprocable bar 32 one end of which is pivoted to a pin 41 fixed eccentrically on a rope pulley 42. Pulley 42 is coupled via rope 43 and rope pully 44 for rotation with the driven shaft 45 of the developing apparatus 1. A sleeve 46 guides the bar 32 so that it moves forward and backward almost horizontally between limiting positions which are represented in FIG. 1, respectively, by the full-time and the dotted-line showings of a curved forward end portion 47 of the bar 32 and a thrust pin 48 fixed to this bar.

The concentration control system 4 starts functioning when the concentration of the azo component in the developing liquid held in receptacle 2 falls below the desired concentration thereof by more than a certain acceptable percentage of variation. Upon such a lowering of the concentration, the meter 25 sinks into the developing liquid until the enlargement 28 has dropped so far that it lies in the path of motion of the curved end portion 47 of the bar 32. When the bar 32 next moves to the right as viewed in FIG. 1, its end portion 47 pushes the disk-like enlargement 28 to the right also, and enlargement 28 in turn pushes lever 35 to the right so as to tilt this lever over to its spooning position represented by broken lines in FIG. 1. In the return stroke of the bar 32, the thrust pin 48 fixed to this bar engages the right-hand side of lever 35 and pushes the lever back to its pouring position represented by full lines in FIG. 1. Thus, a quantity of the developer concentrate is taken from the reservoir 29 and added to the stock of developing liquid in receptacle 2 by the action of the spoon element 36 in each oscillation of the dosing device 31.

For as long as the concentration meter 25 stays lowered so that the enlargement 28 is in the path of movement of bar end portion 47, the dosing device 31 continues to be oscillated with the rotations of pulley 42 and thus repeatedly to add quantities of the concentrate into the stock of the developing liquid. Since these additions increase the concentration of the azo component in the stock of developing liquid, the concentration meter 25 rises as they occur until it has returned to the height that it occupies when the liquid has the required concentration, whereupon the enlargement 28 no longer lies in the path of the curved portion 47 of the bar 32, the lever 35 is returned to its full line position represented in FIG. 1, and the spooning action of device 31 is discontinued.

Too high a concentration of the azo component in the developing liquid can only be caused by evaporation of the solvent, which results in a lowering of the liquid level in the receptacle 2. This, however, is corrected by the action of the dosing valve 19 which immediately responds to a lowering of the liquid level so as to admit solvent into the receptacle and thereby reduce the azo component concentration.

Figure 2:
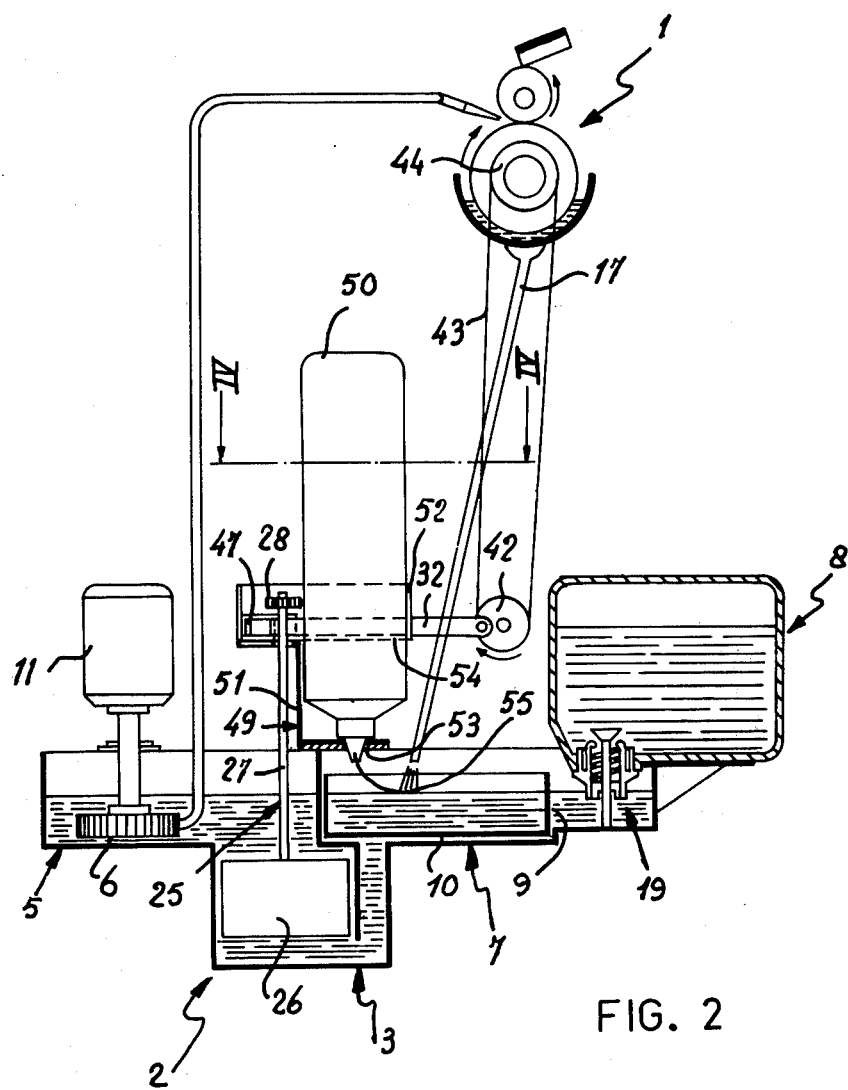
FIG. 2 is a schematic sectional view of another embodiment of the invention.
Figure 4:
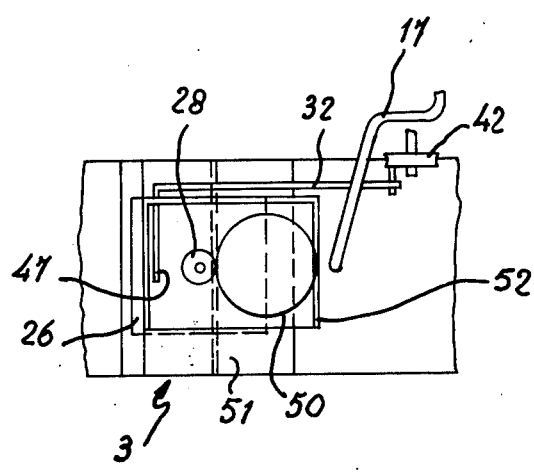
FIG. 4 is a plan view of a portion of the apparatus of FIG. 2, taken from line IV—IV in FIG. 2.

The embodiment of the invention illustrated in FIGS. 2 and 4 is the same as that illustrated in FIG. 1, excepting that it makes use of a different means for supplying the developer concentrate into the receptacle holding the store of the developing liquid. The apparatus thus includes, as previously described, a developing apparatus at 1, a developing liquid receptacle 2 having intercommunicating sections 3, 5 and 7, a concentration meter 25 in section 3, having a head 28 on a rod 27 extending from a float body 26 immersed in the liquid, a pump 6 in section 5 for transporting the developing liquid and a solvent reservoir 18 in section 7 for supplying solvent into the reserve liquid.

The concentration meter 25 cooperates, just as in the first embodiment, with a bar 32 which is reciprocated by an eccentric on a rope pulley 42 driven by the rope 43 and rope pulley 44.

The reserve supply of the developing liquid concentrate in this embodiment is held in a closed supply bottle 50 having an elastically pliable wall and provided with an outlet nozzle 55 the opening of which is so restricted that the liquid cannot leave the bottle by its own gravity and will exude only when the pressure inside the bottle is increased by an additional pressure applied externally to the bottle wall. As before, the concentrate contains an azo coupling component at a concentration several times higher than the concentration thereof required in the developing liquid.

The supply bottle 50 is clamped in a holder 49 at a small distance from the enlargement or head 28 on the rod 27 of the concentration meter 25. The holder 49 comprises an angled support 51 fixed to the top of receptacle 2 and a U-shaped support 52 firmly secured to the vertical leg of the angled support 51. An opening 53 in the horizontal leg of support 51 and an opening 54 in the U-shaped support 52 receive and hold the supply bottle 50 in inverted, vertical position with its nozzle 55 extending downwardly through opening 53 toward the developing liquid help in receptacle 2.

When the concentration of azo coupling component in the developing liquid in receptacle 2 falls by more than a certain permitted percentage below the desired concentration, the concentration meter 25 sinks in the developing fluid, being no longer suspended therein to its normal elevation by flotation. The enlargement 28 on rod 27 then drops into the path of movement of the curved portion 47 of bar 32, whereupon this bar when moving in the direction toward the supply bottle 50 carries the enlargement 28 in the same direction and presses it against the elastically pliable bottle wall. That wall thus is pressed inwards so that, by the resulting increased pressure on the contents of the bottle, a quantity of the developer concentrate is injected through the nozzle 55 into the developing liquid held in receptacle 2. Just as in the case of the first embodiment, the continuing reciprocation of the enlargment 28 by the bar 32 results in the continuing injection of doses of the developer concentrate until the concentration of the developing liquid has been restored to the prescribed value, at which point the immersion body 26 has risen in the liquid to a location at which the enlargement 28 is elevated out of the path of movement of the curved end portion 47 of the bar 32.

What is claimed is:

1. An apparatus for controlling the concentration of a reserve supply of a diazotype developing liquid containing at least one azo coupling component and electrolyte dissolved in a solvent, including a receptacle for holding said liquid supply and means for delivering liquid from said receptacle to the development zone of a semi-dry diazotype developing apparatus, the combination which comprises a first container holding a body of said solvent, a second container holding a body of a liquid developer concentrate containing said at least one azo coupling component and said electrolyte at a concentration substantially greater than that of said developing liquid, means responsive to a lowering of the volume of said liquid supply below a certain level in said receptacle for delivering solvent from said first container into said receptacle until the liquid therein is restored to said level, a hydrometer immersed in the liquid of said supply so as to float therein at a certain elevation when the specific gravity of said liquid corresponds to the required concentration thereof, and means activated in response to a sinking of said hydrometer in said liquid to a location below said certain elevation for dosing quantities of said concentrate from said second container into said receptacle, said hydrometer comprising a buoyant body immersed in said supply liquid, a rod extending upwardly from said buoyant body and an enlargement on said rod above said liquid level, said dosing means comprising a reciprocable displacing element and drive means for reciprocating said element in a substantially horizontal path, said enlargement lying outside the path of said element when said hydrometer is at said certain elevation and lying in said path so as to be engaged and displaced laterally by said element in each reciprocation of said element upon said sinking of said hydrometer, and means operated upon each lateral displacement of said enlargement by said element for dispensing a quantity of said concentrate from said container into said receptacle.

2. Apparatus according to claim 1, said dispensing means comprising a closed bottle constituting said second container and having an elastically displaceable side wall and a restricted outlet orifice directed downwardly toward said liquid supply in said receptacle, said side wall being disposed in the path of and compressible by lateral displacement of said enlargement.

3. Apparatus according to claim 1, said dispensing means comprising a rockable lever having an arm in the path of lateral displacement of said enlargement and a spooning element carried by said lever to and from limiting positions in one of which said spooning element receives a quantity of said concentrate and in a second of which it delivers said quantity into said receptacle.

4. Apparatus according to claim 3, said spooning element comprising an elongate trough one end of which constitutes a spoon and extends over said body of developer concentrate and the other end of which extends over said receptacle, said lever being pivoted for movement to immerse said spoon in said body of developer concentrate in said one limiting position and to elevate said spoon and flow said quantity of concentrate along said trough and from said other end thereof into said receptacle upon return of said lever to said second limiting position.

5. A Apparatus according to claim 3, said lever being pivoted on a fixed axis, said lever arm extending above said axis and having mounted on its upper end a weight so located that said lever is biased toward said second limiting position by said weight.

* * * * *